(Model.)

3 Sheets—Sheet 1.

A. C. SABEY.
SEWING MACHINE.

No. 353,381. Patented Nov. 30, 1886.

Witnesses:
Chas. J. Baw
H. M. Munday

Inventor:
Anton C. Sabey.
by Munday Evarts & Adcock
his Attys.

(Model.)
A. C. SABEY.
SEWING MACHINE.
No. 353,381. Patented Nov. 30, 1886.
3 Sheets—Sheet 2.
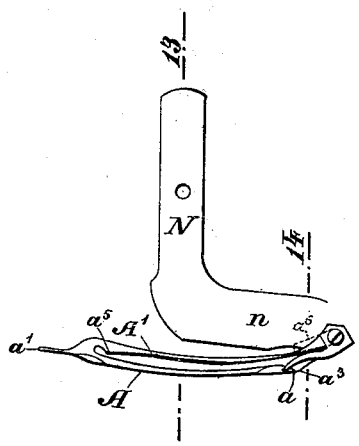
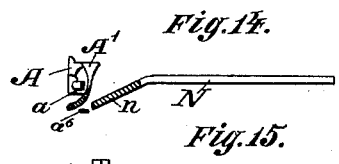
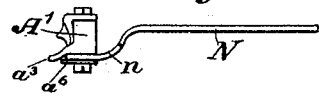
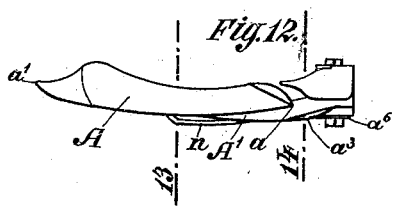
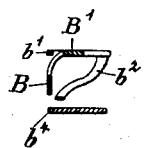
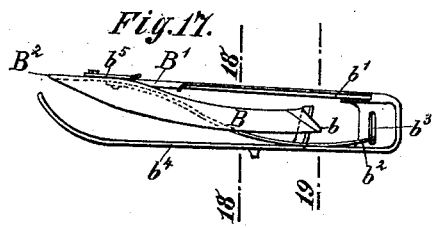
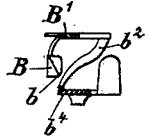
Witnesses:
Chas Baur
H. W. Munday.
Inventor:
Anton C. Sabey.
by Munday Evarts & Adcock
his Attys (Model.)  3 Sheets—Sheet 3.

A. C. SABEY.
SEWING MACHINE.

No. 353,381.  Patented Nov. 30, 1886.

Witnesses:  Inventor:
  Anton C. Sabey.
  by Munday Evarts & Adcock
  his Atty.

UNITED STATES PATENT OFFICE.

ANTON C. SABEY, OF KANSAS CITY, MISSOURI, ASSIGNOR TO HIMSELF, AND GEORGE P. BENT, OF CHICAGO, ILLINOIS.

SEWING-MACHINE.

SPECIFICATION forming part of Letters Patent No. 353,381, dated November 30, 1886.

Application filed September 17, 1885. Serial No. 177,344. (Model.)

*To all whom it may concern:*

Be it known that I, ANTON C. SABEY, a citizen of Norway, residing in Kansas City, in the county of Jackson and State of Missouri, have invented a new and useful Improvement in Sewing-Machines, of which the following is a specification.

Lock-stitch sewing-machines are generally preferred to chain-stitch machines, and are consequently sold in greater numbers. It is, however, often very desirable to use the chain-stitch instead of the lock-stitch, and hence a machine capable of making both kinds of stitches is needed; and it is the object of my invention to provide such a machine which can be changed from one kind of stitch to the other in a moment's time.

My invention, however, relates only to that class of lock-stitch machines employing shuttles having a backward-and-forward or to-and-fro movement in a straight or curved path.

The object mentioned I accomplish by providing machines of the class just described with loopers adapted to be inserted in the shuttle carriers or drivers of such machines in lieu of the shuttles, and to be operated by such carriers, the carriers themselves being in no wise changed either in construction or mode of operation from those now in use. These loopers are loosely held in the carriers in the same way as the shuttles are held, and can be readily substituted for or removed and replaced by the shuttles. When in the carriers, they harmonize with the rest of the machine, requiring no different stroke of carrier, no different setting or threading of needle, and no alteration of tension.

The invention consists, therefore, in the combination, with the to-and-fro-moving shuttle carrier or driver of a lock-stitch sewing-machine, of a looper adapted to be held in and carried by such carrier or driver in lieu of the shuttle.

The invention further consists in the novel construction of said looper, whereby it is thus adapted to be used interchangeably with the shuttle.

Figure 1:
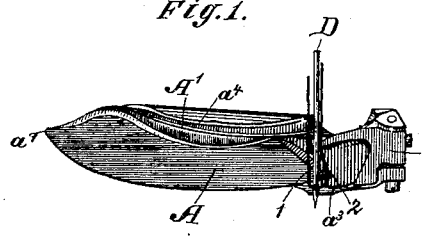
Figure 2:
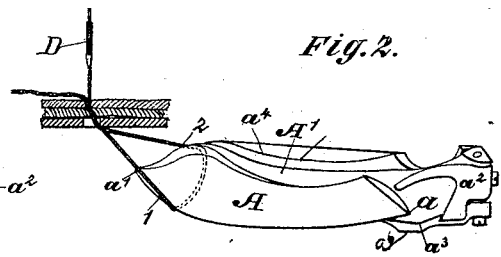
Figure 3:
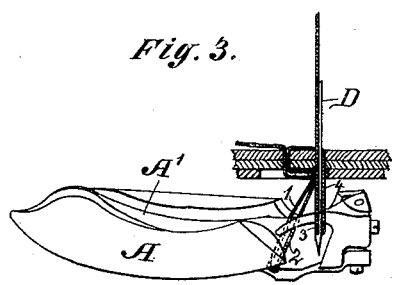
Figure 4:
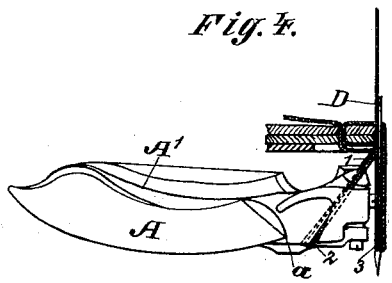
Figure 9:
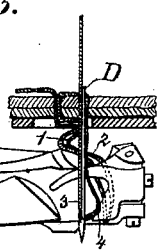
Figure 6:
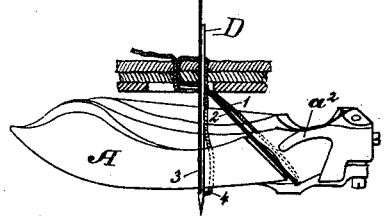
Figures 5, 8:
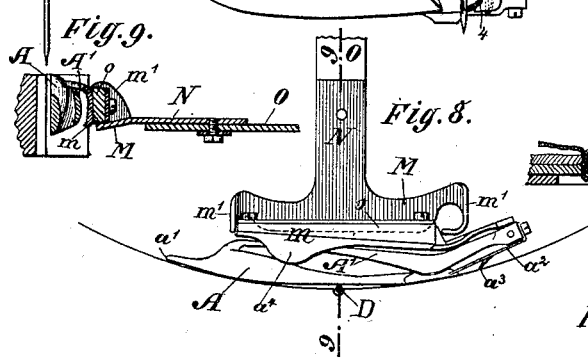
Figure 7:
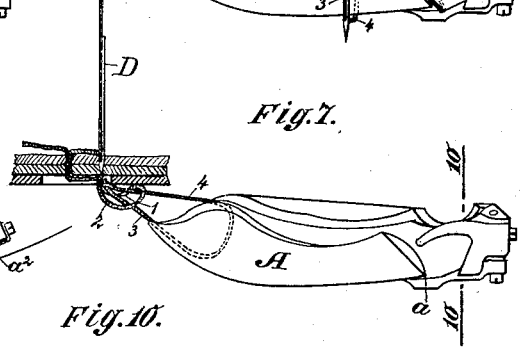
Figure 10:
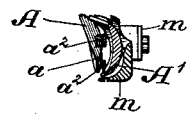
Figure 20:
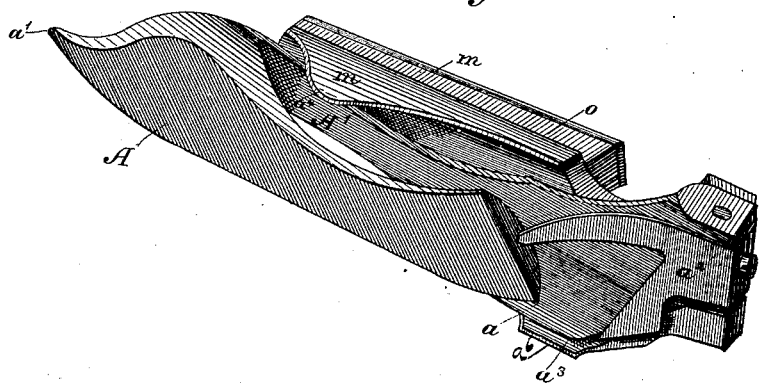
Figure 21:
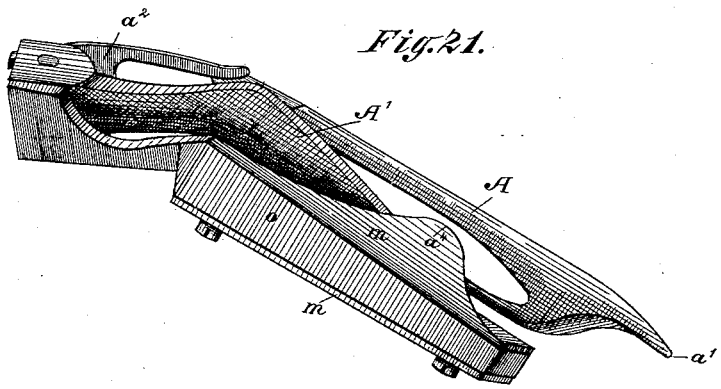
Figure 22:
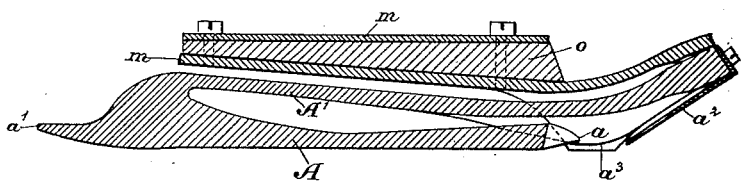

In the drawings forming a part of this specification, Figures 1 to 7, inclusive, are side views of my improved looper, showing the same in the different positions assumed by it in the course of its work, Fig. 1 showing it in the act of entering the loop just formed by the descent of the needle. Fig. 2 shows it at the end of its forward movement after engaging the loop and at the moment when the loop slips from one limb to the other of the hook. In Fig. 3 it has moved part way, and in Fig. 4 it is near the extreme of its backward throw. In Fig. 5 it has commenced its second advance, and in Fig. 6 it has entered the second loop. Fig. 7 shows it at the end of the second advance. Fig. 8 is a plan of the looper in connection with the carrier or shuttle arm of a sewing-machine. Fig. 9 is a section on line 9 9 of Fig. 8, and Fig. 10 is a section on line 10 10 of Fig. 7. Figs. 11 and 12 are respectively plan and side views of the looper secured to a "shuttle-lever," so called, in contradistinction from the carrier shown in previous views. Figs. 13 and 14 are sections on lines 13 13 and 14 14, respectively, of said Figs. 11 and 12. Fig. 15 is an end view of the carrier and looper shown in Figs. 11 to 14. Figs. 16 and 17 illustrate a modification of the looper, and Figs. 18 and 19 are sections of such modification on lines 18 18 and 19 and 19, respectively. Figs. 20 and 21 are perspectives of the looper upon an enlarged scale, and Fig. 22 is a horizontal section thereof.

When my looper is used with the class of carrier, M N, shown in Figs. 8 and 9, I provide it with a back, *m*, which is engaged at the ends by the retaining arms or projections *m'* of the carrier. With this kind of carrier it is secure if laid in the embrace of the arms *m'* in the same manner shuttles are usually positioned therein; but the looper may be attached directly at its end to the lateral portion *n* of the carrier.

O represents the shuttle-lever of an oscillating-shuttle machine; but the carrier may be of any known pattern, and be operated in any of the known ways of operating the kinds of shuttles for which my looper may be substituted.

I make my looper in the form of a hook, whereof A is one limb and A' the other, the extremity of the former constituting the point *a*, whereby the loops are engaged. This point passes close to the needle D, so it will enter the loop 1 2 as soon as the thread becomes slack. As the looper advances, the loop rides along the limb A thereof until the limit of movement in that direction is reached. At this time the thread lies in the crotch of the hook, and is slightly distended by the retreat of the needle, and appears as in Fig. 2. The loop is now ready to slip over the shipper-point $a'$, formed upon and projecting longitudinally from the bend of the hook, in which operation the part 1 of the loop, which has heretofore been upon the outside of limb A, passes around to the back side of limb A', while the part 2 continues in the space between limbs A and A'. The looper now begins its backward movement, which continues without change with the loop-encircling limb A', until the loop reaches the guard $a^2$, which catches the part 2 of the loop and confines it closely against limb A'. This guard may be variously fashioned either as in Figs. 1 to 7 or as in Figs. 11 and 12. Its function is important, as it controls the loop, keeping it out of the way of the descending needle, preventing it from brushing aside the next loop, 3 4, now just being formed, and holding it when the looper changes direction against slipping back thereon until the next loop has been caught and has passed along some distance over limb A. It carries the thread past the needle and retains control until the slack (shown in Fig. 5) is taken out, as in Fig. 6, when, of course, the thread frees itself therefrom by the continued movement of the looper. At this time the new loop has been safely caught, (see same figure,) and is beyond danger of interference. In passing out from under the guard the thread 2 rides over a projection, $a^3$, on arm A', which serves as a cast-off to throw it outside of the point $a$, so that the loop 1 2 will then be outside both limbs of the looper and free to be drawn entirely off when the looper passes beyond the needle, as in Fig. 7. In thus passing off the looper the loop 1 2 is drawn over or outside of the loop 3 4, so that when the former is tightened in the fabric by the ascent of the needle, as in Fig. 7, it will inclose the strands of the latter. This completes the stitch, and the operation with succeeding stitches is, of course, precisely the same.

At $a^4$ is shown an overhanging lip attached to the back $m$, and at $a^5$ in Fig. 11 is shown an inward projection upon the arm A'. These are equivalent devices for preventing the thread after being drawn into the shape seen in Fig. 2 from sliding back on the looper when the latter reverses its movement, as the thread might do if stiff. These devices $a^4$ $a^5$ compel the thread to move with the looper by holding the bight of the loop so long as it is slack. I thus insure the loop being sufficiently tight when it reaches the guard $a^2$ to cause it to enter under such guard. The guard $a^2$ may be so adjusted as to exert just the right amount of friction upon the thread to hold it for the purposes above set forth; or a spring, $a^6$, (shown in Figs. 11, 12, 14, and 15,) may be employed to produce this function. Such a spring (for which a brush or a pad is a well-known equivalent) will obviate the adjusting of the guard and answer for all sizes of thread.

In the modification shown at Figs. 16 to 19 the point $b$ corresponds to the point $a$, the limb B to the limb A, the limb B' to the limb A', the point $B^2$ to the shipper-point $a$, the spring $b^5$ to the loop-detainer $a^4$, and the spring $b'$ to the guard $a^2$, while the spring $b^2$ serves as the cast-off $a^3$, and also as the friction-producing spring $a^6$, and still further it conducts the thread below arm B, thereby serving one function of arm A'. This latter spring is secured to arm B', and its free end rests in the slot $b^3$, so that the thread cannot slip over such end. A back, $b^4$, serves as the means of attachment to the shuttle-carrier.

It will be noticed that my improved loop-taker or looping-hook is capable of being used in any machine having an oscillating or reciprocating shuttle in place of such shuttle, and that it may be substituted therefor as readily as one shuttle can be substituted for another, thereby enabling me to produce at will either form of stitch with the ordinary lock-stitch shuttle-machine.

Inserted in the back $m$ of the loopers used with shuttle-carriers M N is a portion, $o$, of rawhide or similar material, forming the surface which comes in contact with the arms and bottom of the carrier. I thus obviate the noise which would be caused by the contact of metal with metal at these points.

The outstanding lip $a^6$, just below the cast-off $a^3$ and projecting somewhat beyond it, as shown more especially in Fig. 20, is designed to bear against the shuttle-race and allow a free passage for the thread between the race and the cast-off, and also to prevent frictional contact and wear of the latter with the race.

A peculiarity of my invention lies in the fact that the thread is not passed entirely around the outside of the looper, as it is with a shuttle; but instead it is first caught by one limb of the looper, thence it is shifted to the other limb, and finally passes back over both limbs and off. It need never come in contact with the carrier, and hence is left very free to be controlled and directed by the looper. Another peculiarity is, that the limbs of the looper are in the same horizontal plane, instead of being one above the other, the former being the preferable construction. There is also a peculiar combination between the cast-off and the engaging-point, as the former throws the loop, as it is about to be discharged, over said point and prevents its catching thereon.

I claim—

1. The combination, with the eye-pointed needle and the to-and-fro-moving shuttle carrier or driver of a lock-stitch sewing-machine, of a looper adapted to be held in and carried by such carrier or driver in lieu of the shuttle, substantially as specified.

2. The combination, with the eye-pointed needle and the shuttle-carrier, of the hook-shaped looper, the extremity of one limb whereof carries the point $a$, for engaging the loops, substantially as specified.

3. The combination, with the eye-pointed needle and the to-and-fro-moving shuttle carrier or driver, of a looper having a back, $m$, substantially as specified.

4. The combination, with the eye-pointed needle and a to-and-fro-moving shuttle-carrier, of the looper consisting of the hook A A', having the engaging-point $a$, the shipper $a'$ at the bend, the guard for confining the loop, and the cast-off $a^3$, substantially as specified.

5. The combination, with the eye-pointed needle and the to-and-fro-moving shuttle-carrier, of the looper consisting of hook A A', having the engaging-point $a$, the shipper $a'$, the guard for confining the loop, the loop-detaining device $a^4$, and the cast-off $a^3$, substantially as specified.

6. The looper provided with the cushion $o$, in combination with a shuttle-carrier, substantially as specified.

7. The eye-pointed needle and the to-and-fro-moving carrier, in combination with the looper having a loop-engaging point, $a$, and a shipper, $a'$, substantially as set forth.

8. The eye-pointed needle and the to-and-fro-moving carrier, in combination with the hook-shaped looper, the limbs whereof are in the same horizontal plane, substantially as specified.

9. The eye-pointed needle and the to-and-fro-moving carrier, in combination with a hook-shaped looper, the limbs whereof are in the same horizontal plane, and the bend of which looper is provided with a shipper, $a'$, substantially as specified.

10. The eye-pointed needle and the to-and-fro-moving carrier, in combination with a looper having a confining-guard, $a^2$, substantially as specified.

11. The looper having a cast-off, $a^3$, and the projecting lip $a^6$ below the cast-off, the latter bearing against the shuttle-race, in combination with the shuttle-carrier and the eye-pointed needle, substantially as and for the purpose set forth.

12. As a new article of manufacture, a chain-stitch looper consisting, essentially, of a hook-shaped frame having the point $a$, the shipper $a'$, a guard for confining the loop to prevent interference with the following loop, and a cast-off projection, substantially as specified.

ANTON C. SABEY.

Witnesses:
H. M. MUNDAY,
CHAS. J. BAUR.